United States Patent [19]
Flynn et al.

[11] Patent Number: 4,840,840
[45] Date of Patent: Jun. 20, 1989

[54] COMPOSITE MATERIAL

[75] Inventors: Nigel Flynn; Nigel Clark, both of Bolton, England

[73] Assignee: Lantor (UK) Limited, Bolton, England

[21] Appl. No.: 128,901

[22] Filed: Dec. 4, 1987

[30] Foreign Application Priority Data

Dec. 10, 1986 [GB] United Kingdom ............... 8629566

[51] Int. Cl.[4] ............................................. B32B 5/16
[52] U.S. Cl. .................................... 428/283; 428/287; 428/288; 428/296; 428/408; 428/919
[58] Field of Search ............... 428/281, 283, 288, 296, 428/408, 919

[56] References Cited

U.S. PATENT DOCUMENTS 4,162,496 7/1979 Downen et al. ............... 343/18 A
4,411,948 10/1983 Ogino et al. .................... 428/283

Primary Examiner—Marion C. McCamish
Attorney, Agent, or Firm—Oliff & Berridge

[57] ABSTRACT

A composite material for the absorbtion of microwave radiation comprises a number of layers of non-woven textile fabric. The layers of fabric are bonded together, each layer containing differing quantities of a comminuted conductive material, such as dispersed carbon.

10 Claims, 1 Drawing Sheet

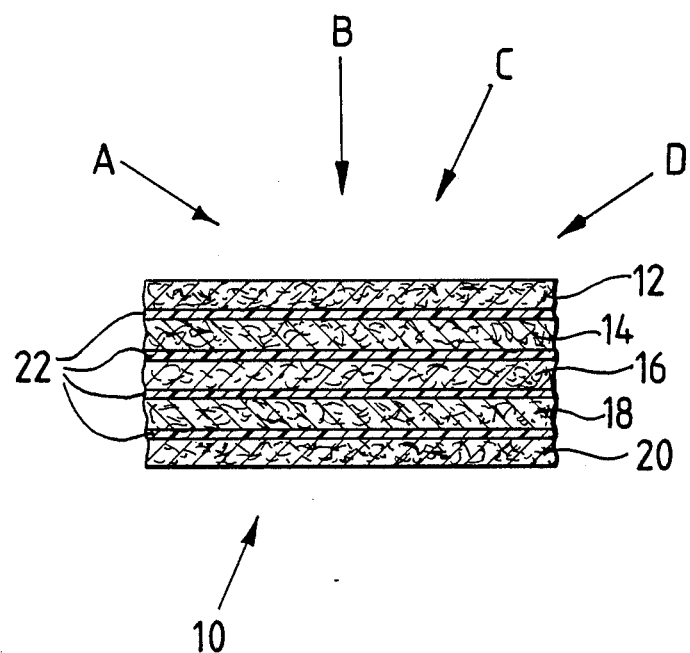

COMPOSITE MATERIAL

This invention relates to a composite material more particularly for use as a microwave absorbing material.

Such materials can be used to shield objects so that a radar image of the object is negated or distorted thereby rendering an incorrect image of the object under surveillance.

According to one aspect of the invention there is provided a composite microwave absorbent material comprising a plurality of layers of fabric, adjacent layers of said fabric being joined together, each said layer containing a comminuted conductive material, the amount of conductive material being different in successive fabric layers.

Preferably the amount of conductive material in successive layers increases from the external fabric layer to the internal fabric layer, the internal layer being that layer adjacent the object to be shielded from radar surveillance. The conductive material can comprise finely divided carbon, in which the majority of particles are less than 75 microns in size.

In one example according to the invention, the amount of carbon in the external fabric layer of the material can be 18 grams per square meter increasing to 62 grams per square meter on the internal fabric layer, the material having five fabric layers in all, each fabric layer comprising approximately a fiber blend of 70% Wool, 15% Viscose, 10% Cotton and 5% Nylon by weight.

The fabric material of each layer is preferably a non-woven material constructed from natural, synthetic, inorganic or artificial fibers or mixtures of any two or more of these fibers. The material grammage can be typically between 200 to 300 grams per square meter and a thickness of 3.5 to 4 millimetres, but is not limited to these grammage and thickness ranges.

The bonding agents used to join adjacent fabric layers can comprise natural or synthetic polymer lattices or powders, e.g. polyacrylates or nitrile rubbers or synthetic fibers themselves e.g. polypropylene or polyamide which can, under the action of heat and pressure be used to effect bonding of webs of fibrous materials. A thermoformable binder may also be used. A 'stiff' binder may also be used e.g. aqueous dispersion of a self-reactive vinyl acetate copolymer or other to produce a hard, rough, nonwoven material with structural applications.

Each fabric layer is made from a fiber of natural, synthetic, inorganic, artificial fibers, or a mixture of any two or more of these, which are bonded together using a bonding agent as outlined above. The fibrous fabric can be manufactured by any of the wellknown web-forming techniques such as dry-laid, wet-laid or spun-bonded methods. A particularly suitable method is by carding a web of textile fibers, depositing a layer of these fibres on a moving foraminous carrier in the form of a fleece by means of an air-stream, saturating the fleece with a bonding agent by means of impregnation, spraying, coating, foaming, or powder coating techniques and then heating the impregnated fleece to gel and cure the bonding agent. The heating process may be at a temperature of 100° centigrade to 200° centigrade for a period of between one and five minutes.

The conductive material may be very finely divided carbon powder in aqueous dispersion, and applied to the nonwoven bonded fabric by impregnation, spraying, coating, foaming together with a polymeric bonding agent which is applied at the time of bonding the fleece of fibers. The dispersion of particulate conductive material is preferably applied to a previously formed fiber bounded fabric together with a fixing agent in order to fix the conductive material to the fabric. This may be a thermosetting resin and/or synthetic polymeric latex binder.

The fixing agent and bonding agent may be the same or different. Such fixing/bonding agents may be for example a polyacrylic resin butadiene acrylonitrile or butadiene styrene rubber or polyvinylchloride.

The carbon containing solution may comprise a dispersed carbon black mixture, a chemical binder, a thickener, a wetting agent and the solution being finally made up to the correct quantity by the addition of water.

The present invention will now be more particularly described with reference to the accompanying drawing which shows a section through a portion of a piece of composite microwave absorbent material according to the present invention to an enlarged scale.

Referring to the drawing, a microwave absorbing material 10 comprises five layers 12, 14, 16, 18 and 20 of carbon containing non-woven fabric material. Adjacent fabric material layers are joined together by a binder layer 22.

Each of the layers 12, 14, 16, 18 and 20 contain an even dispersion of finely divided conductive carbon derived from furnace black with a particles size range typically between 40 and 170 microns in increasing quantities. The amount of carbon in the layer 12 being the smallest and the amount of carbon in the successive layers increases to a maximum in the layer 20.

In the example, the amount of carbon in the layer 12 is 18.5 grams per square meter, in the layer 14, 34 grams per square metre, in the layer 16, 48.3 grams per square meter, in the layer 18, 55 grams per square meter and in the layer 20, 62.2 grams per square meter.

Each of the layers 12, 14, 16, 18 and 20 consist of a nonwoven fiber material comprising approximately 70% Wool, 15% Viscose, 10% Cotton and 5% Nylon, having a weight in the range of 200 to 300 grams per square meter and a thickness of 3.5 to 4 millimeters. The layers 12, 14, 16, 18 and 20 essentially consist of a random array of the above fiber blend in a styrene butadiene binder.

Each layer is subjected to a wet carbon impregnation process involving the passing of each layer through a solution of carbon containing material or spraying the solution onto each layer and then being subjected to a drying process at a temperature in the range of 100° to 200° centigrade for a period of one to five minutes. The times and temperatures are adjusted to suit the circumstances. The impregnation process may involve one or more passes to obtain the correct carbon content through the carbon containing solution in order to obtain the correct carbon content for each layer.

In one example, the carbon containing solution can comprise a dispersed carbon black mixture, a binder, a thickening agent and a wetting agent with the balance of the solution being made up by water. In a typical example the dispersed carbon black constitutes 21% of the solution by weight, the binder 14% by weight, the thickener 1.5% by weight, the wetting agent 0.9% by weight and 63% being water. The amount of each constituent can be varied to suit the amount of carbon to be impregnated and in some cases the thickener and wetting agent can be omitted.

The binder can comprise a styrene butadiene binder known under the trade name REVINEX 9042, the thickener can comprise a thickener known under the trade name LATEKOLL D, and the wetting agent can be a wetting agent known under the trade name COPTAL.

The layers 22 can comprise a low-melting point polyamide web and in order to join the layers 12, 14, 16, 18 and 20 together after carbon impregnation has taken place, the layers are interleaved with the polyamide web and the structure is then subjected to pressure at approximately 140° centigrade for a period of time between ten seconds and one minute.

In the alternative, the layers 22 can comprise a chemical binder or adhesive which can be impregnated, sprayed or coated on to the layers 12, 14, 16, 18 and 20.

The amount of carbon in successive layers can be varied to suit in the circumstances to deal with microwave frequencies in the range of 3 to 18 GHz and at all angles of incidence as indicated by the arrows A, B, C and D in the figure.

In another example, each fabric layer consists of a nonwoven carbonised, homopolymer acrylic fiber. The binding agent comprises a chemical binder, for example, an acrylic emulsion polymer or an emulsion copolymer of acrylic ester, forming a pressure-sensitive adhesive to bond together adjacent fabric layers.

In use the composite material is applied to an object which is potentially to be under radar surveillance, for example, a land or sea vehicle with the layer 20 being attached to the exterior of the vehicle. The material may also be formed as a structural material for producing building panels or similar structural elements for the construction of aircraft hangers, bunkers and other defence installations.

The energy of the microwave radiation from the radar surveillance system will be dissipated within the layer of composite material 10 and will be either negate the radar image or distort the radar image produced, thereby giving either no image or a false image of the vehicle or object under surveillance.

The fabric material layers can comprise a nonwoven material of any type providing that carbon or an appropriate conductive material can be dispersed evenly within it and be retained within the layer. Also the layers can be joined together by means other than a polyamide web or a chemical binder.

We claim:

1. A composite microwave absorbent material comprising a plurality of layers of fabric, adjacent layers of said fabric being joined together, each said layer containing a comminuted conductive material, the amount of conductive material being different in successive fabric layers.

2. A material as claimed in claim 1 in which the amount of conductive material is a minimum in a fabric layer defining one outer surface of the absorbent material, and the amount of conductive material is a maximum in the fabric layer defining the other outer surface of the absorbent material, the amount of conductive material in the intermediate layers increasing from a minimum to a maximum in successive intermediate layers.

3. A material as claimed in claim 1 in which the conductive material comprises dispersed carbon.

4. A material as claimed in claim 1 in which the fabric layers comprise a non-woven textile fabric, the fabric being formed from one or more fibers selected from the group comprising natural, synthetic, inorganic and artificial fibers.

5. A material as claimed in claim 1 in which the fabric layers are joined together by bonding agent selected from the group comprising, natural or synthetic polymer lattices or powders including polyacrylates and nitrite rubbers, and aqueous dispersons of self reactive acetate copolymers.

6. A material as claimed in claim 1 in which each layer of fabric is separately subjected to a conductive material containing solution comprising dispersed carbon, a binder, a thickening agent, a wetting agent and water, prior to joining the layers to form the composite absorbent material.

7. A material as claimed in claim 1 in which the weight mass of each fabric layer is in the range 200 to 300 grams per square meter, and each layer contains dispersed carbon in the range of 18 to 62 grams per square meter.

8. An object at least partially covered by a material as claimed in claim 1, the fabric layer of the material containing the highest amount of conductive material being positioned adjacent the object.

9. An object as claimed in claim 8 comprising a vehicle or building.

10. A composite microwave absorbent material capable of absorbing microwave radiation in the range 3 to 18 GHz comprising a plurality of layers non-woven textile fabric bonded together, each said layer containing dispersed carbon in the range 18 to 62 grams per square meter, the amount of carbon increasing from a minimum to a maximum within said range in successive fabric layers, that layer of the absorbent material containing the maximum amount of dispersed carbon being capable of location adjacent the surface of an object to be shielded from microwave radiation.

* * * * *